United States Patent

[11] 3,532,181

| [72] | Inventors | Anthony J. DeMaria<br>West Hartford;<br>Michael J. Brienza, Vernon, Connecticut |
|---|---|---|
| [21] | Appl. No. | 642,824 |
| [22] | Filed | June 1, 1967 |
| [45] | Patented | Oct. 6, 1970 |
| [73] | Assignee | United Aircraft Corporation<br>East Hartford, Connecticut<br>a corporation of Delaware |

[54] LASER INDUCED ACOUSTIC GENERATOR
7 Claims, 1 Drawing Fig.

[52] U.S. Cl. ................................................. 181/0.5,
250/83.3
[51] Int. Cl. ................................................. G10k 10/00;
G10l 1/10, G10l 1/00
[50] Field of Search ....................................... 250/83.3,
83.31(IR); 181/0.5

[56] References Cited
UNITED STATES PATENTS

| 2,870,338 | 1/1959 | Gillson | 250/83.3 |
| 3,313,937 | 4/1967 | Hadni | 250/83.3 |
| 3,322,231 | 5/1967 | Gournay | 181/0.5 |
| 3,384,749 | 5/1968 | Golay | 250/83.3 |
| 3,072,819 | 1/1963 |  | 315/11 |

*Primary Examiner*—Benjamin A. Borchelt
*Assistant Examiner*—Thomas H. Webb
*Attorney*—Donald F. Bradley ABSTRACT: Microwave acoustic waves of discrete frequencies are generated by the irradiation of an acoustic transmitting medium with uniformly spaced, ultrashort optical pulses produced by a mode-locked laser. For high frequencies, a thin absorbing film is deposited on one end of the acoustic medium, and the laser pulses impinge on the film. The acoustic waves propagate through the acoustic medium and are received via a transducer attached to the acoustic medium.

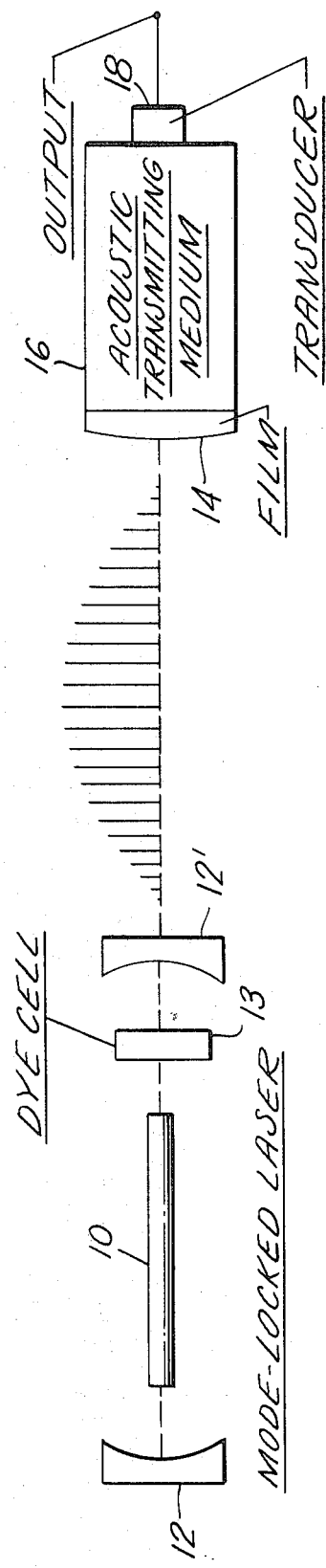

LASER INDUCED ACOUSTIC GENERATOR

BACKGROUND OF THE INVENTION

1. Field of the Invention

This invention relates to the generation of acoustic waves, and more particularly to the irradiation of a solid with uniformly spaced, ultrashort optical pulses generated by a mode-locked laser to produce pulses of sound having a high harmonic content well into the microwave region.

The desirability of generating acoustic waves in the microwave frequencies is readily apparent. For example, high frequency acoustic waves are extremely useful in applications such as delay lines, flaw detection, and the investigation of materials.

2. Description of the Prior Art

It is known in the prior art that the transient heating of certain materials by pulse radiation from lasers, microwaves, electric arcs and electron beams results in the generation of easily detectable elastic waves in the materials. Likewise it is known that the irradiation of certain materials with a Q-spoiled laser pulse produces a single shock wave and a continuous frequency spectrum in the materials.

This invention describes the generation of microwave sound in materials by transient heating induced by the irradiation of the materials with a mode-locked laser to produce a set of discrete, harmonically related frequencies. This invention also describes means for generating short acoustic pulses which could not be produced prior to this invention.

SUMMARY OF THE INVENTION

An object of this invention is to provide a means for generating microwave sound of a discrete frequency which is of extremely high frequency and acoustic power.

Another object of this invention is to provide a method for generating microwave sound utilizing a mode-locked laser.

Another object of this invention is to provide a method for generating extremely short pulses of sound.

In accordance with the invention the output of laser such as Nd:glass is mode-locked to produce a series of evenly spaced pulses in a pulse train. The laser pulse train is made to impinge on a thin absorbing film such as gold, tin or copper deposited on one end of an acoustic transmitting medium such as a sapphire crystal. The crystal is preferably bar-shaped. The thermal stressing caused by the partial absorption of the laser pulse train by the absorbing film propagates short acoustic pulses into the crystal. The acoustic pulses have discrete frequency components, with their fundamental frequency fixed by the repetition rate of the laser pulses, and are rich in harmonic content. The acoustic pulses are fed to an output device such as a coaxial cable by an output transducer, or, in the case of certain crystals, via the surface piezoelectric effect.

The acoustic generator of this invention requires no electrical connections, since even the reception and detection of the acoustic waves may be accomplished optically. In addition, very high acoustic power is available, and very high frequencies may be generated due to the high harmonic content of the optical pulse train. The acoustic generation is uniform and broadband and the frequencies can be varied by changing the optical cavity length of the laser. Very precise frequencies can be obtained. Further, the entire apparatus is simple and easy to fabricate.

In addition to the longitudinal and transverse waves produced by this invention, surface waves may also be produced.

DESCRIPTION OF THE DRAWING

The single figure shows schematically the apparatus for generating the microwave sound.

DESCRIPTION OF THE PREFERRED EMBODIMENT

Referring to the figure, there is shown a mode-locked laser 10 having reflecting end mirrors 12 and 12'. The laser may be an Nd:glass, ruby, Nd:YAG or other well known type of laser capable of generating a series of uniformly spaced, ultrashort light pulses of the amplitude required. The laser may be CW or Q-switched to produce the desired pulse train. The pumping apparatus and other equipment necessary for laser operation is not shown.

Mode-locking of lasers is well known. Mode-locking may be accomplished utilizing dye cells, or by acoustic waves, to lock in phase the oscillations of the axial modes of the laser cavity. A dye cell 13 is shown to accomplish the mode-locking. One method of mode-locking a laser is described in copending application Ser. No. 552,315 entitled "Laser Pulse Shaping Using Acoustic Waves," filed May 23, 1966, by Anthony J. DeMaria and assigned to the same assignee.

The mode-locked laser is actuated to produce a series of light pulses, for example of $10^{-12}$ to $10^{-11}$ seconds time duration, evenly spaced by the optical circulation time of the laser feedback cavity. Typical pulse trains exhibit a spacing of approximately 5 nanoseconds, representing a pulsing rate of 200 MHz. The average energy in a single pulse is typically of the order of 1 millijoule, and an entire pulse train contains from 100 to 150 individual pulses, lasting about 0.4 to 0.6 $\mu$ sec.

The pulse train from the laser is directed onto a thin absorbing film 14 which is preferably bonded or deposited on an acoustic transmitting medium such as a crystalline bar 16. Typically the bar 16 is LiNbO$_3$, 15 mm. $\times$ 5 mm. $\times$ 5 mm., but may be glass, quartz, sapphire or any other acoustic transmitting material. In some applications the film may be sandwiched between two crystals. A single crystal material is preferred, but is not essential, and a liquid cell may be used. For optical detection of the acoustic waves, an optically transparent crystal is preferred.

The thin metallic film is typically gold, tin, copper or silver, but other elements or compounds may be used, and nonmetals such as semiconductors or crystalline materials which exhibit proper rate of change of temperatures may be used and in some cases may be preferred. A gold film of 1.2 microns bonded to an LiNbO$_3$ cryatal has proven satisfactory. The film must be optically absorbing, and its thickness is limited only by the length of the wave being absorbed, i.e., the film should be $\leq \frac{1}{2}$ wavelength of the sound wave.

The thermal stressing caused by the partial absorption of the laser pulse train by the metal film propagates short discrete acoustic pulses into the crystalline bar. The acoustic pulse train has a fundamental frequency equal to the frequency of the pulse repetition rate of the laser pulse train. Once produced, the acoustic pulse train echoes back and forth within the crystal and has a duration equal to the length of the laser pulse train. Because the individual laser pulses are of very short duration, especially with respect to their repetition time, the acoustic waves contain a high harmonic content. At room temperature, echoes of the tenth harmonic at 2GHz have been observed using a gold film bonded to LiNbO$_3$. Considerably higher frequencies can be generated, possibly up to $10^{11} - 10^{12}$ cps, and it should be possible to generate sound frequencies as high as $F \approx 1/\Delta\tau$ where $\Delta\tau$ is the laser pulse width.

The acoustic waves have been observed at 40 db above the noise level, and are strictly confined to the harmonic frequencies of the laser pulse repetition frequency. The acoustic frequencies are easily variable by an adjustment of the laser cavity length, i.e., the distance between mirrors 12 and 12'.

The acoustic pulses generated in the crystal 16 may be fed to an output device by means of an electrical transducer 18 such as CdS bonded to the end of the crystal 16 opposite the metal film. Crystals such as LiNbO$_3$ or quartz do not require a separate output transducer since they act simultaneously as a delay medium and a piezoelectric transducer. In this type of operation a coaxial microwave line may be connected directly to the crystal 16 to transmit the acoustic pulses. The high piezoelectric surface coupling of LiNbO$_3$ also eliminates the relatively narrow bandwidth of thickness resonant transducers such as quartz or CdS films.

Calculations show that the thermal gradients produced by the absorption of a typical Q-switched ruby laser pulse can be as high as $10^6$ deg/cm with temperature rate changes as high as $10^{10}$ deg/sec. It has also been shown that the conversion efficiency by which sound is produced in transient surface heating varies linearly with the incident peak power density and is inversely proportional to the first power of the sound frequency. Thus the acoustic waves observed are believed to be thermally generated in the optical skin depth of the thin metallic film where the energy from the laser pulses is absorbed. Therefore it is necessary that the optical energy be absorbed in a region which is thin compared to the acoustic wavelength desired. Thus a thin film on an otherwise transparent or semitransparent acoustic transmitting medium provides the necessary absorption of the incident radiation.

The high harmonic content of the acoustic waves indicates that the acoustic pulses have risetimes much less than one nanosecond, and less than 0.5 nanosecond with the pulses spaced 5 nanoseconds apart. Thus the absorption of the very short, high intensity laser pulses produce very rapid rise, short duration acoustic pulses. The spatial extent of the acoustic pulses is about $10\mu$.

For lower frequency acoustic pulse generation, bars or blocks of materials may be used without the necessity of a thin film. In the case of such bulk materials as stainless steel, nickel and germanium, which are less susceptible to damage than thin films, extremely large amounts of acoustic energy can be injected into the material at any desired discrete frequency.

A one-meter Nd:glass laser rod was mode-locked in an 8-foot cavity producing a pulsing rate of 60 MHz. The energy of the entire mode-locked pulse train was 20 to 50 joules with an average energy of 0.2 joules per pulse. With this high energy laser, very intense acoustic pulses were produced in the bars, and, in one case, the acoustic compressions generated by the unfocused laser beam completely destroyed a 2-inch bar of fused quartz. At 60 MHz sound echoes were produced in samples of stainless steel and germanium. The energy produced is well in excess of the energy that can be injected through the use of conventional transducers.

Although the invention has been shown and described with respect to a preferred embodiment, it is understood that numerous changes may be made without departing from the scope of the invention, which is to be limited and defined only by the following claims.

We claim:

1. Apparatus for generating acoustic waves of microwave frequencies comprising:
   a mode-locked laser for generating a train of uniformly spaced phase-locked optical pulses;
   an acoustic transmitting medium;
   thin metallic film attached to one surface of said acoustic transmitting medium and in contact therewith;
   means for irradiating said metallic film with said pulse train and generating discrete acoustic waves therein having a fundamental frequency equal to the repetition rate of said laser pulses; and
   said metallic film being optically absorbing at the frequency of said optical pulses and having a thickness approximately equal to or less than one-half the acoustic wavelength, said acoustic waves being propagated from said metallic film into said acoustic medium.

2. Apparatus as in claim 1 in which said optical pulses have a time duration of $10^{-11}$ to $10^{-12}$ seconds.

3. Apparatus as in claim 1 in which said acoustic transmitting medium is a crystalline bar, said metallic film being mechanically bonded to one face of said bar.

4. Apparatus as in claim 1 in which said acoustic transmitting medium is an optically transparent material.

5. Apparatus as in claim 1 and including output means connected to said acoustic transmitting medium for converting said acoustic waves to an electrical output signal.

6. Apparatus as in claim 1 in which said acoustic transmitting medium is a piezoelectric crystal.

7. The method of generating microwave frequency acoustic waves in an acoustic transmitting medium on at least a portion of which is bonded a thin optically absorbing metallic film having a thickness approximately equal to or less than one-half the wavelength of the acoustic waves, which comprises the steps of:
   generating a train of uniformly spaced, phase locked optical pulses; and
   irradiating said thin metallic film with at least one of said optical pulses.